(12) United States Patent
Crews

(10) Patent No.: US 7,256,160 B2
(45) Date of Patent: Aug. 14, 2007

(54) FRACTURING FLUIDS FOR DELAYED FLOW BACK OPERATIONS

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 669 days.

(21) Appl. No.: 10/270,807

(22) Filed: Oct. 14, 2002

(65) Prior Publication Data

US 2003/0092581 A1 May 15, 2003

Related U.S. Application Data

(60) Provisional application No. 60/338,577, filed on Nov. 13, 2001.

(51) Int. Cl.
*C09K 8/62* (2006.01)
*C09K 8/66* (2006.01)

(52) U.S. Cl. ............... 507/211; 507/201; 507/209; 507/273; 507/920; 507/922

(58) Field of Classification Search ........... 507/100, 507/101, 103, 110, 111, 112, 113, 114, 115, 507/116, 140
See application file for complete search history.

(56) References Cited

U.S. PATENT DOCUMENTS

| | | | | |
|---|---|---|---|---|
| 3,415,936 A | * | 12/1968 | Hitzman | 514/561 |
| 3,727,687 A | * | 4/1973 | Clampitt et al. | 166/400 |
| 4,148,736 A | * | 4/1979 | Meister | 507/203 |
| 4,552,591 A | * | 11/1985 | Millar | 106/18.33 |
| 5,002,125 A | | 3/1991 | Phillips et al. | |
| 5,016,714 A | * | 5/1991 | McCabe et al. | 166/308.1 |
| 6,138,760 A | | 10/2000 | Lopez et al. | |
| 6,227,295 B1 | | 5/2001 | Mitchell et al. | |
| 6,488,091 B1 | * | 12/2002 | Weaver et al. | 166/300 |
| 6,613,720 B1 | * | 9/2003 | Feraud et al. | 507/200 |
| 2002/0019318 A1 | * | 2/2002 | Harris | 507/200 |

FOREIGN PATENT DOCUMENTS

| | | |
|---|---|---|
| EP | 0 540 204 A2 | 5/1993 |
| GB | 2 377 238 A | 1/2003 |
| WO | WO 02/070862 A1 | 9/2002 |

OTHER PUBLICATIONS

British Search Report for Application No. GB 0226321.8, May 1, 2003.

* cited by examiner

*Primary Examiner*—Philip C. Tucker
(74) *Attorney, Agent, or Firm*—Madan Mossman & Sriram PC

(57) ABSTRACT

It has been discovered that certain fracturing fluid compositions can be used to fracture a subterranean formation and be permitted to stay within the formation for a relatively extended period of time, for example 28 days or more, before being flowed back or produced. At least two embodiments are envisioned, a bacteria-containing formulation and an anti-bacterial formulation. Both systems would be expected to prevent the potential of the fluid to oil wet the formulation (water block condition) by keeping the formation water wet through the use of water wetting surfactants or solvents. Additionally, both formulations would control reservoir crude souring ($H_2S$ generation by in situ sulfate-reducing bacteria), reservoir plugging (via slime biopolymers generated by in situ microbes, inorganic scale deposition like calcium carbonate or barium sulfate, and clay fines migration).

9 Claims, No Drawings

FRACTURING FLUIDS FOR DELAYED FLOW BACK OPERATIONS

CROSS-REFERENCE TO RELATED APPLICATION

This application claims the benefit of U.S. Provisional Application No. 60/338,577 filed Nov. 13, 2001.

FIELD OF THE INVENTION

The present invention relates to fluids used in fracturing subterranean formations during hydrocarbon recovery operations, and more particularly relates, in one embodiment, to fracturing fluids that remain in the formation for relatively long periods of time.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity.

Fracturing fluids also include additives to help inhibit the formation of scale including, but not necessarily limited to carbonate scales and sulfate scales. Such scale cause blockages not only in the equipment used in hydrocarbon recovery, but also can create fines that block the pores of the subterranean formation. Examples of scale inhibitors and/or scale removers incorporated into fracturing fluids include, but are not necessarily limited to polyaspartates; hydroxyaminocarboxylic acid (HACA) chelating agents, such as hydroxyethyliminodiacetic acid (HEIDA); ethylenediaminetetracetic acid (EDTA), diethylenetriaminepentaacetic acid (DTPA), nitrilotriacetic acid (NTA) and other carboxylic acids and their salt forms, phosphonates, and acrylates and mixtures thereof.

Fracturing fluids that are crosslinked with titanate, zirconate, and/or borate ions (using compounds which generate these ions), sometimes contain additives that are designed to delay crosslinking. Crosslinking delay agents permit the fracturing to be pumped down hole to the subterranean formation before crosslinking begins to occur, thereby permitting more versatility or flexibility in the fracturing fluid. Examples of crosslink delay agents commonly incorporated into fracturing fluids include, but are not necessarily limited to organic polyols, such as sodium gluconate; sodium glucoheptonate, sorbitol, glyoxal, mannitol, phosphonates, aminocarboxylic acids and their salts (EDTA, DTPA, etc.) and mixtures thereof. Another type of crosslink delay mechanism for borate crosslinked fluids is type, amount, and particle size distribution of borate mineral particles. An example is the product Fracsal Waterbase available from TBC-Brineadd (Houston, Tex.).

Other common additives employed in conventional fracturing fluids include crosslinked gel stabilizers that stabilize the crosslinked gel (typically a polysaccharide crosslinked with titanate, zirconate or borate) for a sufficient period of time so that the pump rate and hydraulic pressure may fracture the subterranean formations. Suitable crosslinked gel stabilizers previously used include, but are not necessarily limited to, sodium thiosulfate, diethanolamine, triethanolamine, methanol, hydroxyethylglycine, tetraethylenepentamine, ethylenediamine and mixtures thereof.

Additional common additives for fracturing fluids are enzyme breaker (protein) stabilizers. These compounds stabilize the enzymes and/or proteins used in the fracturing fluids to eventually break the gel after the subterranean formation is fractured so that they are still effective at the time it is desired to break the gel. If the enzymes degrade too early they will not be available to effectively break the gel at the appropriate time. Examples of enzyme breaker stabilizers commonly incorporated into fracturing fluids include, but are not necessarily limited to sorbitol, mannitol, glycerol, citrates, aminocarboxylic acids and their salts (EDTA, DTPA, NTA, etc.), phosphonates, sulphonates and mixtures thereof.

It has become desirable to fracture a well, break the gel as in a conventional fracturing treatment, but keep the broken fracturing fluid within the formation for a relatively long period of time, for instance at least one month or up to nine months or longer. However, leaving the fracturing fluid composition within the formation presents additional concerns, such as oil wetting of the formation by the fluid, increasing the water saturation or water blocking by the fluid, disturbing the clay particles within the formation and inducing clay swelling or clay migration which will result in reservoir permeability damage, souring of the reservoir crude (which is caused by $H_2S$ generation by in situ sulfate-reducing bacteria), reservoir plugging (slime biopolymers generated by in situ microbes) and inorganic scale deposition (such as barium sulfate). It would be helpful if multifunctional fracturing fluid compositions could be devised that have suitable properties or characteristics that would permit the fracturing fluid to remain in the formation for extended periods of time.

SUMMARY OF THE INVENTION

Accordingly, it is an object of the present invention to provide a multifunctional fracturing fluid that may be left in a fractured formation for an extended period of time.

It is another object of the present invention to provide a multifunctional fracturing fluid that prevents oil wetting of the formation.

Another object of the invention is to provide a multifunctional fracturing fluid that is inhibited in its tendency to water block the formation.

Another objective of the invention is to provide a multifunctional fracturing fluid that inhibits clay swelling and/or migration formation damage.

Yet another object of the invention to provide a multifunctional fracturing fluid that is inhibited in its tendency to generate $H_2S$.

Still another object of the present invention to provide a multifunctional fracturing fluid that is inhibited in its inclination to plug the reservoir with slime biopolymers.

One other object of the present invention is to provide a fracturing fluid that will inhibit inorganic scale depositions of calcium or barium sulfate scales.

In carrying out these and other objects of the invention, there is provided, in one form, A method for fracturing a subterranean formation that involves first pumping a fracturing fluid composition down a wellbore to a subterranean formation. The fracturing fluid composition is permitted to gel, although the time frame for gel formation could begin while the composition is being pumped down the wellbore, and may continue while fracturing occurs. The fracturing fluid composition is then pumped against the subterranean formation at sufficient rate and pressure to fracture the formation. The fracturing fluid composition gel is substantially broken after fracturing has taken place. The broken fracturing fluid composition is then left in the formation for a relatively extended period of time, in one non-limiting example, at least 28 days. Subsequently the fracturing fluid composition is flowed out of the formation.

The multifunctional fracturing fluid composition useful in the method described immediately above may include, in one non-limiting embodiment of the invention, at least one hydratable polymer, at least one water wetting control agent, at least one clay control agent, at least one microbe growth control agent, at least one scale inhibitor, and at least one breaking agent.

DETAILED DESCRIPTION OF THE INVENTION

Polymer-based fracturing fluid systems have been discovered for use in oil and gas well fracturing treatments where the fracturing fluid is to remain within the formation for a period of time greater than 28 days. At least two embodiments are envisioned. One system would be an anti-bacterial-based formulation, while the other would be a bacteria-based formulation. Both systems would control or prevent the potential of the fracturing fluid composition from oil wetting the fractured subterranean formation (prevent an increase in oil saturation). In addition, both systems would also manage the tendency of the fracturing fluid composition to adversely alter the water saturation of the formation, to prevent a decrease in water saturation commonly known as water block—another undesirable event. Both systems would also prevent clay induced formation damage, such as clay migration and pore throat reservoir plugging. Reservoir crude souring, or the generation of hydrogen sulfide ($H_2S$) by in situ sulfate-reducing bacteria would also be inhibited by both embodiments of the inventive composition. Both embodiments of the invention would be expected to control reservoir plugging, such as that caused by slime biopolymers generated by in situ microbes. Additionally, both embodiments of the invention would be expected to control reservoir plugging, such as that caused by inorganic scale deposits, such as barium sulfate.

The fracturing method using the fracturing fluid compositions of the invention proceeds essentially conventionally and includes, but is not limited to the following procedure:
  a. Pumping a fracturing fluid composition down a wellbore to a subterranean formation;
  b. Permitting the fracturing fluid composition to gel;
  c. Pumping the fracturing fluid composition against the subterranean formation at sufficient rate and pressure to fracture the formation;
  d. Breaking the fracturing fluid composition gel;
  e. Leaving the fracturing fluid composition in the formation for a relatively extended period of time; and
  f. Subsequently flowing the fracturing fluid composition out of the formation.

By leaving the fracturing fluid in the formation for a relatively extended period of time is meant that the fluid whose gel has been broken is not flowed back out of the well bore (or produced) relatively soon or even immediately after the gel is broken. In one non-limiting embodiment of the invention, the fracturing fluid having reduced viscosity is left in the formation at least 28 days. The broken fluid could remain in the formation up to nine months or longer.

The fracturing fluid composition of the invention has the following general formula:
  i) at least one hydratable polymer;
  ii) at least one water wetting control agent;
  iii) at least one salt clay control agent;
  iv) at least one microbe growth control agent;
  v) at least one scale inhibitor;
  vi) at least one breaking agent;
  vii) optionally, an organic clay control agent; and
  viii) optionally, at least one biocide.

Of course, like most fracturing fluids, these contain water as a primary component, making up the remainder of the composition.

It is very difficult to determine with precision and in advance what the optimum proportion of the components of the fracturing fluid composition of this invention will be due to a number of complex, interrelated factors including, but not limited to, the structure of the formation, the temperature and pressure of the formation, the hydrocarbon and/or water mixture within the formation, the design of the fracturing job, the particular components used in the fracturing fluid, etc. Nevertheless, in an effort to give some indication of suitable proportions of the various components of the inventive formulation, the components may have the broad and preferred proportional ranges shown in Table I, in one non-limiting embodiment. The proportions are based on the total fracturing fluid composition.

TABLE I

| Component | Broad range | Preferred range |
|---|---|---|
| Hydratable polymer | about 0.12 to about 0.75% bw | about 0.24 to about 0.6% bw |
| Water wetting control agent | about 0.05 to about 3.0% bv | about 0.1 to about 1.0% bv |
| Additional water wetting | about 0.05 to | about 0.2 to |

TABLE I-continued

| Component | Broad range | Preferred range |
|---|---|---|
| agent/mutual solvent | about 5.0% bv | about 2.0% bv |
| Salt Clay control agent | about 0.5 to about 12.0% bw | about 2.0 to about 7.0% bw |
| Additional clay control agent | about 0.05 to about 1.0% bv | about 0.2 to about 0.4% bv |
| Microbe growth control agent | about 0.001 to about 2.0% bw | about 0.024 to about 0.36% bw |
| Scale inhibitor | about 0.05 to about 1.0% bv | about 0.1 to about 0.2% bv |
| Demulsifier control agent | about 0.05 to about 1.0% bv | about 0.2 to about 0.5% bv |
| Breaking agent | about 0.0001 to about 0.72% bw | about 0.012 to about 0.12% bw |
| Additional Biocide | about 0.001 to about 1.0% bv | about 0.05 to about 0.2% bv |

The total clay control agent may preferably range from about 1.0 to about 8.0%bv in one non-limiting embodiment of the invention. In another non-limiting embodiment of the invention, the microbe growth control agent preferably ranges from about 0.01 to about 0.72% bw. An intermediate range for the scale inhibitor is from about 0.05 to about 0.5% bv in another non-limiting embodiment of the invention. In a still further non-limiting embodiment of the invention, the breaking agent ranges from about 0.0001 to about 0.48% bw as an intermediate range.

The hydratable polymer may be a polysaccharide, in one non-limiting embodiment of the invention, such as guar, hydroxypropylguar, carboxymethyl guar, carboxymethyl hydroxypropyl guar, and other guar polymer derivatives. The hydratable polymer may be cross-linked, such as by using borate, titanate or zirconate ions, or complexes or combinations thereof. One non-limiting example would be soluble and sparingly soluble boron minerals, such as borax, ulexite, and colemanite minerals. Another non-limiting example would be the use of organically complexed borates, titanates-, or zirconates, such as borate ions complexed onto polyol compounds such as sorbitol, mannitol, sodium gluconate, and the like, to name some non-limiting examples. Hydrating, gelling and crosslinking the polymers would occur as is conventionally known in the art.

The water wetting control agent would be any material that would control water wetting of the formation. Suitable water wetting control agents include, but are not necessarily limited to, any water-wetting (rather than oil-wetting) surfactant and solvents such as ST-100 or ST-101 (both available from Mayco Wellchem, Inc.), ethylene glycol monobutyl ether (EGMBE), diethylene monomethyl glycol ether, methyl pyrrolidone, alcohols (such as isopropanol and ethanol), anionic surfactants such as alkyl sulfates or sulphonates, alkyl carboxylates, alkyl succinates, and alkyl phosphates or phosphonates; non-ionic surfactants such as alkyl glucosides, ethoxylated or propoxylated alkyls or alcohols; and amphoteric surfactants such as amine oxides, alkyl acetates, alkyl propionates, and alkyl betaines, and mixtures thereof. For the practice of this invention, sulfur-containing compounds generally should not be used in the invention.

Suitable clay control agents include, but are not necessarily limited to, potassium chloride (KCl), tetramethylammonium chloride (TMAC), CS-6 (available from Special Products), ammonium chloride, calcium chloride, magnesium chloride, alkyl quaternary amines, alkyl benzyl quaternary amines, polymeric products having multivalent ions and mixtures thereof.

In general, most all of the components from the fracturing fluid composition of the invention should not contain sulfur because in situ sulfate-reducing bacteria may digest the molecules and produce hydrogen sulfide with the sulfur. The exception is the use of sulfur in surfactants, particularly in alkyl benzyl sulphonate surfactants since the sulfur in this form is typically more stable. Toward this end, no persulfate breakers should be used in the fracturing fluids, including any encapsulated persulfates. Additionally, no thiosulfate high temperature gel stabilizers should be employed. Instead, if high temperature stability is desired or needed, it is suggested that triethanolamine (TEA) be used, a known polymer stabilizer for high temperature crosslink stability applications. TEA is available as N-140 from Brenntag. Other suitable non-sulfur containing high temperature gel stabilizers include, but are not necessarily limited to, methanol, diethanolamine, ethylenediamine, n-butylamine, and mixtures thereof.

In situ microbe control can also be positively accomplished by including bacteria that compete with the in situ bacteria for non-polymer nutrients. Such bacteria include, but are not limited to, *Pseudomonas aeruginosa, Pseudomonas fluorescens, Pseudomonas putida, Serratia marscescens, Enterobacter colacae, Nitrabacter vulgaris, Nitrosomonas europeea, Clostridium pasteurianum, Bacillus thuringiensis, Bacillus stearothermophilus, Corynebacterium insidiosum, Rhodococcus* ST-5, and combinations thereof. In one non-limiting embodiment, these bacteria would be present in the fracturing fluids in amounts of about 0.5 to 1.0 by volume (bv).

Further, in both embodiments of the invention, control of sulfate-reducing bacteria (to prevent $H_2S$ crude souring) and control of bio-polysaccharide (slime) production by in situ microbes may be controlled by including one or more components from the following list, which include, but are not necessarily limited to, potassium nitrate, sodium nitrate, sodium phosphates, ammonium nitrate, ammonium phosphate, sodium chlorate, sodium bromate, sesquicarbonate, potassium odate, potassium iodide, potassium iodine, sodium iodate, sodium iodide, methanol, ethanol, isopropanol, butanol, sodium carbonate, sodium bicarbonate, sodium salicylate, phenolic compounds, triclosan, betadine (polyvinylpyrrolidone-iodine iodophor), other iodophors, potassium bromate, potassium perchlorate, potassium nitrite, potassium chlorate, periodates, ammonium bromide, sodium bromide, sodium nitrite, potassium bromide, calcium bromide, zinc bromide, hypochlorites, sodium chlorite, potassium chlorite, hydroxymethyl glycinate, metal complex polyols or amino acids (such as copper gluconate, copper glycinate, copper aspartate), quaternary ammonium compounds, and mixtures thereof.

Suitable conventional scale inhibitors include, but are not necessarily limited to SWC-203 (available from Baker Oil Tools), polyaspartates, imidosuccinates, polycarboxylics, organophosphonates, organocarboxylates, acrylates, acrylamides, succinates, gluconates, and mixtures thereof. Such scale inhibitors are employed to prevent potential scale build up when the fracturing fluid and the formation brine completely commingle over the extended time period.

Various known breaker aids may also be employed, including but not necessarily limited to, amines and amino compounds (such as triethylene glycol diamine and arginine), metal complexes (such as copper EDTA and copper gluconate), sorbitol, sodium sesquicarbonate, mannitol, gluconates, chlorites, hypochlorites, chlorates, perchlorates, hypochlorates, percarbonates, bromates, peroxides, periodates, and mixtures thereof.

In the anti-bacterial embodiment of the fracturing fluid composition of the invention, surfactant agents may include thermally stable or thermally unstable quaternary amines that serve as a long term or temporary biocide. Such biocides would be unsuitable for the bacterial embodiment of the fracturing fluid composition because they would destroy the useful bacteria intentionally incorporated into the formulation, as will be described later. Suitable quaternary amines for this purpose include, but are not necessarily limited to, cocodimethyl ammonium chloride, dodecyidimethyl ammonium chloride, alkyldimethylbenzyl ammonium chloride, dialkyldimethylbenzyl ammonium chloride, and mixtures thereof. Additionally the oxyhalogen compounds usable as breakers can also serve as biocidal agents in the anti-bacterial embodiment.

Also in the anti-bacterial embodiment of the fracturing fluid composition of the invention, microbe growth inhibition may be achieved by including a metal ion such as zinc, tin, copper, cobalt, antimony, beryllium, cadmium, chromium, copper, nickel, selenium or silver ions. Suitable sources of copper, silver, and other ions include, but are not necessarily limited to, copper or silver chelated to tetrasodium ethylenediaminetetracetic acid ($Na_4EDTA$) or to other aminocarboxylic acids, copper or silver complexed to chitosan and chitosan derivatives, copper or silver complexed to polyols such as gluconate or glucoheptonate, copper, cobalt, or silver complexed to amino acids or metalloproteins, copper or silver naphthenate, copper or silver quinolinolate, and copper carbonate and mixtures thereof. Additionally in this embodiment, oxidizer breakers may be used to break or reduce the viscosity of the fracturing fluid after the formation is fractured.

Suitable oxidizer breakers include, but are not necessarily limited to, sodium percarbonate, sodium bromate, sodium chlorite, sodium chlorate, sodium perchlorate, potassium chlorite, potassium chlorate, potassium perchlorate, potassium chlorite, hypochlorites, calcium and magnesium peroxides, sodium or potassium nitrite, sodium or potassium nitrate, periodates, and mixtures thereof.

In the bacteria formulation embodiment of the invention, the breakers for the gels after fracturing may include bacteria and enzymes, as are well known in the art. Suitable bacteria breakers include, but are not necessarily limited to, poly-saccharide decomposing (eating or digesting) bacteria, such as thermophillic, barophillic, and/or non-biopolymer (slime) generating types of bacteria or microbes, which include, but are not necessarily limited to, Bacillus subtilis, Bacillus licheniformis, Bacillus ciculans, Pseudomonas putida, Pseudomonas fluorescens, Candida albicans, Aspergillus niger, Aspergillus oryzae, Eniterococcus faecium, Corynebacterium species, Clostridium ATCC #53797 and other species, Streptomyces species, Rhodococcus species, Anthrobacter species, Nocardia species, and mixtures thereof. In one non-limiting embodiment of the invention, such gel breaking bacteria or microbes are used in a proportion of about 0.1 to 1.0% by. With respect to enzyme breakers, suitable enzymes include, but are not necessarily limited to, GBW-174L (available from BIO-CAT, Inc.), PLEXIGEL 10L (available from Chemplex), HC-70 (available from Chemgen), GAMMANASE 1.0L (available from Novozymes), and any cellulase and hemi-cellulase enzyme breaker, amylases, pectinases, and xylanases, and mixtures thereof when used in formations having a temperature below about 200° F. (93° C.). Sodium bromate or other known breakers such as chlorites, chiorates, hypochiorites, hypochlorates, calcium peroxide, magnesium peroxide, and aminocarboxylic acids (such as $Na_3HEDTA$ and $Na_3NTA$), may be used when the formation temperature is 200° F. (93° C.) or above. Any of the breakers for the bacterial embodiment of the fracturing fluid or the anti-bacterial embodiment of the fluid may be employed in encapsulated form to delay their contact with the gel and thus delay gel breaking.

The invention will now be further illustrated with respect to certain specific examples which are not intended to limit the invention, but rather to provide more specific embodiments as only a few of many possible embodiments.

EXAMPLE 1

Anti-Bacterial Formulation

One embodiment of a polymer-based anti-bacterial fracturing fluid composition may be as follows:
1. From about 0.001 to about 1.0% bw (by weight) fracturing polymers and crosslinkers; in one embodiment, preferably a borate crosslinked guar.
2. From about 0.05 to about 0.5% by of a thermally stable quaternary amine biocide (such as EC-9555A by Nalco/Exxon).
3. From about 1.0 to about 200 ppm copper ions (e.g. $Na_4EDTA$ chelated copper chloride) and from about 0.01 to about 0.5% bw betadine (PVP-iodine iodophor by BASF) for microbe growth inhibition.
4. From about 0.1 to about 1.0% by ST-100 and/or EGMBE for water wetting control.
5. About 7% bw KCI, about 0.5% by TMAC, and about 0.3% by CS-6 clay control agents.
6. In situ microbe control agents:
   a. No persulfate breakers (including no encapsulated form).
   b. No thiosulfate high temperature gel stabilizer (N-140 (TEA) may be used for high temperature stability).
   c. From about 0.01 to about 0.5% bw sodium nitrate, ammonium phosphate, sodium bromate, and sesquicarbonate for sulfate-reducing bacteria control (no $H_2S$ crude souring) and control of bio-polysaccharide (slime) production by in situ microbes.
7. From about 0.1 to about 0.5% by SCW-203 scale inhibitor.
8. From about 0.0001 to about 0.25% bw sorbitol and/or sodium sesquicarbonate as breaker aids.
9. From about 0.0001 to about 0.25% bw sodium percarbonate, sodium bromate, or sodium chlorite oxidizer breakers.

EXAMPLE 2

Bacteria Formulation

One embodiment of a polymer-based bacteria fracturing fluid composition may be as follows:
1. From about 0.001 to about 1.0% bw fracturing polymers and crosslinkers; in one embodiment, preferably a borate crosslinked guar.
2. About 7% KCI, about 0.5% TMAC, and about 0.3% GS-7 clay control agents.
3. From about 0.1 to about 1.0% by ST.-100 and 0.3 to 1.0% bv EGMBE for water wetting control.
4. About 1.0% bv polysaccharide eating/decomposing bacterial, e.g. thermophillic, barophillic, and non-biopolymer (slime) generating types of bacteria, such as Bacillus Licheniformis, Clostridium species such as ATCC #53797, and FRAC-BAC I and FRAC-BAC II bacteria solutions by Micro-Bac, Round Rock, Tex.

5. About 0.2 to 1.2% bw maltose sugar.
6. In situ microbe control agents:
   a. About 0.5% bv *Pseudomonas Aeruginosa Esmeralda* and *Pseudomonas Florescens* bacteria (by Micro-TES, Inc., San Antonio, Tex.)
   b. No persulfate breakers (including no encapsulated form).
   c. No thiosulfate high temperature gel stabilizer (N-140 (TEA) may be used for high temperature stability).
   d. From about 0.01 to about 0.5% bw sodium nitrate, ammonium phosphate, sodium bromate, and sesquicarbonate for sulfate-reducing bacteria control (no $H_2S$ crude souring) and control of bio-polysaccharide (slime) production by in situ microbes.
7. From about 0.1 to about 0.5% bv SCW-203 scale inhibitor.
8. From about 0.0001 to about 0.5% bw sorbitol and/or sodium sesquicarbonate as breaker aids.
9. From about 0.001 to about 5.0% bv GBW-174L (BIO-CAT, Inc.), PLEXIGEL 10L (by Chemplex, Snyder, Tex.), HC-70 (by Chemgen) or GAMMANASE 1.0L (by Novozymes) enzyme breakers for formations up to 200° F. (93° C.); from about 0.01 to about 0.25% bw $Na_3HEDTA$, $Na_3NTA$, or calcium peroxide for formations at 200° F. (93° C.) and above.

EXAMPLE 3

Bacteria Formulation

One embodiment of a polymer-based bacteria fracturing fluid composition may be as follows:
1. From about 0.001 to about 1.0% bw fracturing polymers and crosslinkers; in one embodiment, preferably a borate crosslinked guar.
2. About 2.0 to 7.0% bw KCl, about 0.2% TMAC, and about 0.4% Claprotek CF (by CESI Chemicals, Marlow, OK) clay control agents.
3. From about 0.2 to about 0.4% bv ST-100 and 0.5 to 2.0% bv EGMBE for water wetting control.
4. About 0.5 to 2.0% bv Paragone E (bacteria solution from Micro-TES, Inc., San Antonio, Tex.) high molecular weight crude oil upgrading and polysaccharide eating/decomposing bacteria: e.g. thermophillic and barophillic non-biopolymer (slime) generating+high molecular weight paraffin decomposing types of bacteria composition.
5. In situ microbe control agents:
   a. No persulfate breakers (including no encapsulated form).
   b. No thiosulfate high temperature gel stabilizer (N-140 (TEA) may be used for high temperature stability).
   c. From about 0.01 to about 0.5% bw sodium nitrate, ammonium phosphate, and sesquicarbonate for sulfate-reducing bacteria control (no $H_2S$ crude souring) and control of bio-polysaccharide (slime) production by in situ microbes.
6. From about 0.2 to about 0.5% bv SCW-203 scale inhibitor.
7. From about 0.0001 to about 0.5% bv glucose (62/43 Corn Syrup by ADM Corporation) or sorbitol (Sorbo by SPI Polyols) as breaker aids.
8. From about 0.001 to about 5.0% bv GBW-174L (by BIO-CAT, Inc.), PLEXIGEL 10L (by Chemplex, Snyder, Tex.), HC-70 (by Chemgen) or GAMMANASE 1.0L (by Novozymes) enzyme breakers for formations up to 200° F. (93° C.); from about 0.01 to about 0.25% bw $Na_3HEDTA$, $Na_3NTA$ for formations at 200° F. (93° C.) and above.

EXAMPLE 4

Anti-Bacterial Formulation

One embodiment of a polymer-based anti-bacterial fracturing fluid composition may be as follows:
1. From about 0.001 to about 1.0% bw (by weight) fracturing polymers and crosslinkers; in one embodiment, preferably a borate crosslinked guar.
2. From 1 to 5% bw potassium chloride clay control agent.
3. From about 0.05 to about 0.2% bv of a thermally stable quaternary amine biocide (EC-9555A by Nalco/Exxon).
4. From about 0.1 to about 0.4% bv AG-6206 (alkyl glucoside by Akzo Nobel) and 0.5 to 2.0% bv EGMBE for water wetting control.
5. From about 0.2 to 0.5% bv NE-100 demulsifier.
6. About 0.2% bv TMAC control agent.
7. In situ microbe control agents:
   a. No persulfate breakers (including no encapsulated form).
   b. No thiosulfate high temperature gel stabilizer (N-140 (TEA) may be used for high temperature stability).
   c. From about 0.1 to about 0.5% bv sodium hypochlorite (industrial grade solution) and from about 0.1 to 0.5% bw sodium bromide for sulfate-reducing bacteria control (no $H_2S$ crude souring) and control of bio-polysaccharide (slime) production by in situ microbes.
8. From about 0.1 to about 0.5% bv SCW-203 scale inhibitor.
9. From about 0.01 to about 0.2% bw sodium gluconate and/or sodium glucoheptonate as breaker aids.
10. From about 0.0001 to about 0.25% bw sodium percarbonate, sodium bromate, or sodium chlorite oxidizer breakers.

EXAMPLE 5

Anti-Bacterial Formulation

One embodiment of a polymer-based anti-bacterial fracturing fluid composition may be as follows:
1. From about 0.001 to about 1.0% bw (by weight) fracturing polymers and crosslinkers; in one embodiment, preferably a borate crosslinked guar.
2. From 2 to 7% bw potassium chloride clay control agent.
3. From about 0.05 to about 0.2% bv of sodium hypochlorite (industrial grade solution) biocide.
4. From about 0.1 to about 1.0% bv Simulsol SL 11W (alkyl glucoside by SEPPIC, a subsidiary of Air Liquide) and 0.2 to 1.0% bv M-PYROL (methyl pyrrolidone by ISP Technologies) for water wetting control.
5. From about 0.1 to 0.5% bv NE-200E demulsifier.
6. About 0.2% to 1.0% bv Claprotek CF (choline bicarbonate by CESI Chemical, Marlow, Okla.) clay control agent.
7. In situ microbe control agents:
   a. No persulfate breakers (including no encapsulated form).
   b. No thiosulfate high temperature gel stabilizer (hexamethylenediamine (by DuPont Intermediates & Specialties) may be used for high temperature stability).
   c. From about 0.01 to about 0.5% bw sodium chlorite and from about 0.1 to 0.5% sodium bromide for sulfate-reducing bacteria control (no H$_2$S crude souring) and control of bio-polysaccharide (slime) production by in situ microbes.
8. From about 0.1 to about 0.5% bv sodium iminodisuccinate (Baypure CX-100/34% by Bayer Chemicals) scale inhibitor.
9. From about 0.01 to about 0.2% bv glucose (62/43 Corn Syrup by ADM Corporation) and/or sorbitol (Sorbo by SPI Polyols) as breaker aids.
10. From about 0.05 to about 1.0% bv sodium hypochlorite oxidizer breaker.

EXAMPLE 6

Anti-Bacterial Formulation

One embodiment of a polymer-based anti-bacterial fracturing fluid composition may be as follows:
1. From about 0.001 to about 1.0% bw (by weight) fracturing polymers and crosslinkers; in one embodiment, preferably a borate crosslinked guar.
2. From 2 to 5% bw potassium chloride clay control agent.
3. From about 0.1 to about 0.4% bv of SP-82 (from Special Products) surfactant/biocide.
4. From about 0.1 to about 0.2% bv AG-6206 (alkyl glucoside by Akzo Nobel) and 0.5 to 1.0% EGMBE for water wetting control.
5. From about 0.012 to 0.06% bw Stim-440 (by Mayco Weichem, Houston) demulsifier.
6. About 0.2% TMAC and 0.5% bv Claprotek CF (by CESI Chemical, Marlow, Okla.) clay control agents.
7. In situ microbe control agents:
   a. No persulfate breakers (including no encapsulated form).
   b. No thiosulfate high temperature gel stabilizer (hexamethylenediamine (by DuPont Intermediates & Specialties) may be used for high temperature stability).
   c. From about 0.1 to about 0.2% bv sodium hypochlorite (industrial grade solution) and from about 0.05 to 0.1% bw sodium bromide for sulfate-reducing bacteria control (no H2S crude souring) and control of biopolysaccharide (slime) production by in situ microbes.
8. From about 0.1 to about 0.5% bv sodium iminodisuccinate (Baypure CX-100/34% by Bayer Chemicals) scale inhibitor.
9. From about 0.01 to about 0.2% bw sodium gluconate or 0.05 to 0.3% bv sodium glucoheptonate (ES-50 by C. P. Hall Chemicals) as breaker aids.
10. From about 0.0001 to about 0.25% bw sodium percarbonate, sodium bromate, or sodium chlorite oxidizer breakers.

In the foregoing specification, the invention has been described with reference to specific embodiments thereof, and is expected to be demonstrated as effective in providing fracturing fluid compositions which can remain in the formation for a relatively long time after the formation is fractured and the gel broken before being produced or flowed back. However, it will be evident that various modifications and changes can be made to the fracturing fluid compositions of this invention without departing from the broader spirit or scope of the invention as set forth in the appended claims. Accordingly, the specification is to be regarded in an illustrative rather than a restrictive sense. For example, specific combinations of agents and components, and proportions of these agents and components, falling within the claimed parameters, but not specifically identified or tried in particular compositions, are anticipated and expected to be within the scope of this invention.

I claim:
1. A method for fracturing a subterranean formation comprising:
   a. pumping an anti-bacterial fracturing fluid composition down a wellbore to a subterranean formation;
   b. permitting the fracturing fluid composition to gel;
   c. pumping the fracturing fluid composition against the subterranean formation at sufficient rate and pressure to fracture the formation;
   d. breaking the fracturing fluid composition gel;
   e. leaving the fracturing fluid composition in the formation for at least 28 days; and
   f. subsequently flowing the fracturing fluid composition out of the formation;
where the anti-bacterial fracturing fluid composition comprises:
   i) at least one hydratable polymer;
   ii) at least one water wetting control agent;
   iii) at least one clay control agent;
   iv) at least one microbe growth control agent;
   v) at least one scale inhibitor;
   vi) at least one breaking agent; and
   vii) at least one biocide different from iv) the microbe growth control agent;
where the anti-bacterial fracturing fluid composition controls both sulfate-reducing bacteria and bio-polysaccharide (slime) production.

2. The method of claim 1 where in the fracturing fluid composition there is an absence of components that contain sulfur, except for sulphonates.

3. The method of claim 1 where the fracturing fluid composition further comprises a crosslinking agent.

4. The method of claim 3 where in the fracturing fluid composition the hydratable polymer is guar and where the crosslinking agent is borate ion.

5. A method for fracturing a subterranean formation comprising:
   a. pumping an anti-bacterial fracturing fluid composition down a wellbore to a subterranean formation;
   b. permitting the fracturing fluid composition to gel;
   c. pumping the fracturing fluid composition against the subterranean formation at sufficient rate and pressure to fracture the formation;
   d. breaking the fracturing fluid composition gel;
   e. leaving the fracturing fluid composition in the formation for at least 28 days; and
   f. subsequently flowing the fracturing fluid composition out of the formation;
where the anti-bacterial fracturing fluid composition comprises:
   i) from about 0.12 to about 0.75% bw of at least one hydratable polymer;
   ii) from about 0.05 to about 3.0% bv of at least one water wetting control agent;
   iii) from about 0.5 to about 12.0% bw of at least one clay control agent;
   iv) from about 0.001 to about 2.0% bw of at least one microbe growth control agent;
   v) from about 0.05 to about 1.0% bv of at least one scale inhibitor;
   vi) from about 0.0001 to about 0.72% bw of at least one breaking agent;

vii) at least one crosslinking agent; and
vii) from about 0.001 to about 1.0% bv of at least one biocide different from iv) the microbe growth control agent;

where the anti-bacterial fracturing fluid composition controls both sulfate-reducing bacteria and bio-polysaccharide (slime) production, and where all proportions are based on the total fracturing fluid composition.

6. The method of claim 5 where in the fracturing fluid composition there is an absence of components that contain sulfur, except for sulphonates.

7. The method of claim 5 where in the fracturing fluid composition the hydratable polymer is guar and where the crosslinking agent is borate ion.

8. A method for fracturing a subterranean formation comprising:
  a. pumping a bacterial fracturing fluid composition down a wellbore to a subterranean formation;
  b. permitting the fracturing fluid composition to gel;
  c. pumping the fracturing fluid composition against the subterranean formation at sufficient rate and pressure to fracture the formation;
  d. breaking the fracturing fluid composition gel;
  e. leaving the fracturing fluid composition in the formation for at least 28 days; and
  f. subsequently flowing the fracturing fluid composition out of the formation;

where the bacterial fracturing fluid composition comprises:
  i) at least one polysaccharide hydratable polymer;
  ii) at least one water wetting control agent;
  iii) at least one clay control agent;
  iv) at least one microbe growth control agent;
  v) at least one scale inhibitor;
  vi) at least one breaking agent; and
  vi) at least one polysaccharide-decomposing bacteria.

9. A method for fracturing a subterranean formation comprising:
  a. pumping a bacterial fracturing fluid composition down a wellbore to a subterranean formation;
  b. permitting the fracturing fluid composition to gel;
  c. pumping the fracturing fluid composition against the subterranean formation at sufficient rate and pressure to fracture the formation;
  d. breaking the fracturing fluid composition gel;
  e. leaving the fracturing fluid composition in the formation for at least 28 days; and
  f. subsequently flowing the fracturing fluid composition out of the formation;

where the bacterial fracturing fluid composition comprises:
  i) from about 0.12 to about 0.75% bw of at least one polysaccharide hydratable polymer;
  ii) from about 0.05 to about 3.0% bv of at least one water wetting control agent;
  iii) from about 0.5 to about 12.0% bv of at least one clay control agent;
  iv) from about 0.001 to about 2.0% bw of at least one microbe growth control agent;
  v) from about 0.05 to about 1.0% bv of at least one scale inhibitor;
  vi) from about 0.0001 to about 0.72% bw of at least one breaking agent;
  vii) at least one crosslinking agent; and
  viii) at least one polysaccharide-decomposing bacteria;
where all proportions are based on the total fracturing fluid composition.

* * * * *